United States Patent [19]

Selbe et al.

[11] 4,278,468

[45] Jul. 14, 1981

[54] GYPSUM FIRE BARRIER FOR CABLE FIRES

[75] Inventors: Rexford L. Selbe, Palatine; Vincent M. Waropay, Naperville; Paul S. Quigg, Barrington; William S. Reily, Des Plaines, all of Ill.

[73] Assignee: United States Gypsum Company, Chicago, Ill.

[21] Appl. No.: 74,204

[22] Filed: Sep. 10, 1979

[51] Int. Cl.$^3$ .......................... C04B 11/00; E04B 1/74
[52] U.S. Cl. ............................ 106/111; 106/DIG. 2; 106/110; 52/317; 52/380; 52/383; 174/104; 252/62; 427/403; 264/69; 264/333
[58] Field of Search ...................... 106/109, 110, 111

[56] References Cited

U.S. PATENT DOCUMENTS

| | | | |
|---|---|---|---|
| 1,380,398 | 6/1921 | Lougheed | 106/109 |
| 3,393,116 | 7/1968 | Larson | 106/111 |
| 3,454,456 | 7/1969 | Wilbey | 106/109 |
| 3,819,388 | 6/1974 | Cornwell | 106/109 |
| 3,839,059 | 10/1974 | Rothfelder | 106/109 |
| 3,966,479 | 6/1976 | Koblitz | 106/109 |
| 3,980,437 | 9/1976 | Akabayashi | 106/109 |
| 4,148,660 | 4/1979 | Lankard | 106/109 |

*Primary Examiner*—Brian E. Hearn

*Attorney, Agent, or Firm*—Kenneth E. Roberts; Robert H. Robinson; S. Kurlandsky

[57] ABSTRACT

Electrical power, instrument and communication cables constructed with combustible coverings can provide a pathway by which fire might spread. Cable fires within a room or compartment can be arrested by the construction of a properly designed "fire break" placed periodically along a cable run; and cable fire spread between rooms can be arrested by a properly placed "fire stop". Cable runs generally include a cable tray or raceway to contain the cables. An effective fire barrier, e.g., "fire break" or "fire stop" may be constructed in such a cable tray or raceway by filling a portion of the tray or raceway with a gypsum composition comprising gypsum plaster, an inert filler mixture of diatomaceous earth and lightweight expanded aggregate, and very small amounts of glycerin, boric acid and a corrosion inhibitor such as a boron nitride, boron nitrile or mixture of such boron compounds. The fire barrier is formed by placing in a portion of the cable tray/raceway an aqueous slurry of the plaster composition as described above, slurried with water in amounts of about 10 pounds of the plaster composition and 14–16 pounds of water to form a "pseudo-plastic" mass, and filling all of the voids around and beneath cables therein by applying force to the cable tray/raceway, e.g., as by hammering with a rubber mallet.

11 Claims, No Drawings

GYPSUM FIRE BARRIER FOR CABLE FIRES

BACKGROUND OF THE INVENTION

This invention relates to creating a gypsum fire barrier in cable trays or raceways. It does not relate to forming a sheathing or encasement around individual cables over their entire length as in the manufacture of power, instrument and communication cables and the like; but rather to where a plurality of such manufactured cables in usage placement are in a run, tray or raceway and discrete gypsum composition blocks are separately, individually, placed at interrupted intervals around a section of the cables to form a barrier against fire spread from one side to the other side of the block.

The possibility of fires in areas with high concentrations of instrument and communication wires and power transmission cables has become of great concern to power companies, automated industrial plants and government regulatory bodies. Power, instrument and communication cables constructed with combustible coverings or sheathings can provide a pathway by which fire might spread. Physical discrete barriers (e.g. floors, walls, and ceilings) can serve to contain a cable fire to a given room. However, even at such points of barrier the necessary holes for the cables to pass through walls, floors and ceilings can still provide a means for transmission of the fire to adjoining rooms. Cable fires within a room, further, need to be arrested by the construction of a properly designed "fire break" placed periodically along the cable run.

Cable manufacturers are aware of this problem and have directed efforts towards developing cable insulation characterized by lower flame spread and reduced fuel load. There are also prior attempts to provide insulative coatings or sheathings in the cable manufacturing process. For example, U.S. Pat. No. 2,077,282 discloses constructing a cable with an inner insulated sheath between the cable core and an outer sheath. The insulated sheath, to be selected from a material or mixture of boric acid, calcined gypsum or plaster of Paris, borax, magnesium carbonate, basic magnesium carbonate, ammonium carbonate, aluminum ammonium sulfate, or the carbonates or bicarbonates of the alkali or alkaline earth metals is said to be selected as avoiding explosive gases when an arc in the cable occurs by decomposition of the material by the heat of the arc. That patent further indicates that such materials may be substituted for in part with an inert material such as asbestos. In addition, U.S. Pat. No. 2,207,579 discloses a fire resistant cable in which a layer of spun glass threads bound by a layer of molten glass insulation is applied as the insulating layer between the inner conductor and the outer sheathing, in this case an outer metal casing. U.S. Pat. No. 3,324,232 discloses a transmission cable having an inner sheathing of solid boron nitride within an outer lead sheathing. Only slightly related U.S. Pat. 3,531,678 discloses a heater wire in which the heating filament is surrounded by a boron nitride coating, stating that such coating without an outer sheathing is electrically insulating but thermally conductive. Thus such materials generally depend upon an outer sheathing of electrically conductive, non-insulative material, to provide for an electrical ground. However, such are also known for their attendant costs; and the brittleness of the inner sheathing between the core and the outer metallic sheathing considerably limits flexibility of such cables.

Of course, other materials have been attempted without utilizing the outer metallic sheathing and have generally centered around rendering organic sheathing materials more resistant to fire by the inclusion of fire retardant additives. It does not, however, appear feasible to produce an organic cable insulation which is totally noncombustible or to replace all of the existing highly combustible cable that is already in use.

Divergent from that area of usage it is also known from U.S. Pat. No. 3,393,116 to form a plaster composition for use in thin coat plaster coatings over all surfaces that utilize radiant heating systems. In such systems an electrically resistant element is secured over a gypsum board plaster base and embedded beneath a thin veneer coat plaster surface, with the veneer plaster coating containing small amounts of glycerol and boric acid intended to form a surface adapted to be subjected to temperatures as high as 150° F. without deleterious cracking and strength deterioration of the 1/16-⅛ inch thick veneer layer. In other nonrelated attempts at fire resistant compositions that include gypsum, U.S. Pat. No. 3,885,980 discloses containers, such as burial vaults and safes having an inner liner of a material such as glass fiber mat and a gypsum composition containing as essential included ingredients a magnesium sulfate heptahydrate. That patent notes that borax upon trial proved to be deleterious in its effects upon the setting of plaster of Paris and in disastrously fluxing at high temperatures.

Returning again now to the proposal of a suitable "fire break"/"fire stop" material for usage in cable trays; it is recognized that power, communication and instrumentation cables sheathed with combustible insulation and packed into cable trays or along raceways provide a fuel source for fires. It is not always feasible to either produce a cable insulation which is totally noncombustible nor to replace all of the existing highly combustible cable that is in place in such trays. Thus it would be ideal to place barriers at intervals along such trays or raceways. A candidate for such a fire barrier material, in addition to preventing the spread of flame, must meet several additional functional requirements. Recent electrical code changes have decreased the amount of cable spacing clearance both within trays and between tiers of trays, the trend being to now allow just sufficient space about the trays to permit adequate access for installation and maintainance of the cables. Further, revised electrical codes now permit installation of conductor cables rated 600 volts or less in the same tray; but another section prohibits the mixing of cables rated over 600 volts with cables rated 600 volts or less in the same tray unless the cables are (1) separated by solid, noncombustible, fixed barriers or are (2) type MC (metal-clad) cable.

Prior attempts to formulate fire barriers in cable electrical trays and raceways have heretofore concentrated upon either organic silicone formulations, which are quite expensive; or urethane foam formulations to which a fire retardant chemical has been added, which are not entirely satisfactory in their performance characteristics. Of course, one might think of turning to an inorganic cementitious material for such use but previous attempts have been highly unsatisfactory since most inorganic cementitious materials either shrink excessively upon drying or are not sufficiently expansive after set to remain crack-free or void-free in usage. In addition such formulations may be sufficiently fluid to surround the cables and fill the voids and interstices below and between cables within a packed tray, but are then so fluid that they flow along the tray and away from the area to be filled. Inorganic cementitious materials such as Portland cement suffer an important prohibitive defect in that the fire barrier composition must be sufficiently frangible and of limited strength that a portion of the fire break/fire stop may be readily torn out for the replacement, repair, or addition of cables to the tray or raceway. Quite frequently at some time after an initial raceway has been set up it is mandatory to either remove an existing cable or add additional cables. Ordinary Portland cement develops dry cast compressive strengths in excess of 6,000 pounds per square inch. Ordinary gypsum casting plasters develop about 2,000 p.s.i. Inorganic cementitious materials such as Portland cement have caused the complete destruction of the whole raceway section in attempts to remove a portion of the fire stop for replacement of one or more cables in that raceway. Also the weight of fire barriers with such materials has caused the buckling and collapse of the cable trays.

Thus a summary of functional requirements for a "fire barrier" material is that the material should be totally noncombustible; should provide a substantial heat sink; should in application completely surround the cables and fill all the voids and interstices; be sufficiently viscous to minimize lateral flow along the tray or raceway; be easily removed to permit adding or removing calbes in the tray; be relatively homogeneous and crack free; be low density to not require additional support for cable assemblies; not shrink on drying and setting; and lastly not have any deleterious effect on any of the cables, ancillary insulation, sheathing or jacket of the cables or on the cable tray itself.

SUMMARY OF THE INVENTION

The present invention satisfies the hereinabove mentioned requirements in providing a highly formulated gypsum cement designed to be mixed with water for use as a fire break/fire stop in electrical power, instrument, communication and the like cable systems. The term "fire stop" as used herein refers to floor/ceiling and wall penetrations wherein the electrical cables are passing from one room to another and a fire barrier fills the penetration's openings. The term "fire break" as used herein refers to a block formed in a portion of an electrical cable tray to provide periodic, spaced apart fire barriers at intervals along the course of a cable tray or electrical raceway within a room. Thus in one general aspect, this invention relates to a process for providing a fire barrier protected electrical cable raceway or cable tray through the provision of a discreet block of a highly formulated gypsum cement composition. In one preferred embodiment of the present invention, it has now been found such protection can be provided by a formulated gypsum cement composition comprising, on a percentage basis, about, as follows:

| Ingredient Dry Comp. | General Range | Preferred Formulations | |
|---|---|---|---|
| | | Vermiculite | Perlite |
| Plaster | 30–80% | 60% | 35% |
| Diatomaceous Earth Aggregate | 10–40% | 20% | 35% |
| Second Aggregate: | 10–30% | | |
| Vermiculite | | 20% | |
| Perlite | | | 28% |
| Glycerine | .05–1.25% | .7% | .7% |

| Ingredient Dry Comp. | General Range | Preferred Formulations | |
|---|---|---|---|
| | | Vermiculite | Perlite |
| Boric Acid | .05–.7% of plaster | .07% of plaster | .07% of plaster |
| Corrosion Inhibitor | 0–3% of plaster | .33% of plaster | .34% of plaster |
| Plaster Retarder | 0–3% of plaster | .125% of plaster | .14% of plaster |

Wet Composition

Troweling application: 100–130 pounds of water per 100 pounds of dry composition.

Caulking application: about 120–140 pounds of water per 100 pounds of dry composition to provide for a 4–6 inch slump consistency.

Pumping application: 120–170 pounds of water per 100 pounds of dry composition.

The above formulations provide a highly formulated and finely tuned composition to provide pseudo-plastic flow characteristics in the wet state and; in the dry state after setting, essential low strength characteristics sufficient to provide ease of removal for repair and the addition of new cables, essential low density characteristics to provide for placement in cable trays without having to structurally reinforce the cable tray to take the added weight; and both initial heat resistance in the presence of flames and a residual refractoriness to hold the composition together after cessation of impingement of flames from a fire. In addition the wet composition must be adjusted in setting times to allow sufficient working time for penetration of all interstices between the cables and to allow for a hand placement in awkward working positions, and will thus be provided with conventional retarders to provide a 10 minute to 3 hour set time depending on hand or mechanical placement. The pseudo-plasticity characteristic, wherein the aqueous slurried mass will flow when mechanical energy is imparted as by vibration, intense mechanical mixing and the like yet the material will come to rest and cease to flow upon cessation of or in the absence of such mechanical energy, is essential for the aqueous slurry to penetrate and seal all interstices between the cables and tray or walls/floors and the like. Much of the above are against the normal essential characteristics of gypsum cement compositions in that they generally set to a here undesirably high ordinary dry compressive strength, are susceptible to shrinking and cracking when heated (particularly in large masses) and generally do not exhibit pseudo-plastic flow.

In order to provide the highly tuned and balanced characteristics essential to the performance of the gypsum composition as a fire stop/fire break, the plaster composition must be precisely formulated with regard to both essential ingredients and proportions of those ingredients in the composition, particularly the major ingredients of binder and blended lightweight inert aggregates. This is necessary to insure that the composition in the wet state has the proper consistency for either pumping and spraying (for mechanical application) or troweling (for hand application) while exhibiting pseudo-plastic characteristics; and that the composition in the dry state exhibits a cast density in a 25–35 pounds per cubic foot range and compressive strength within the 50–300 pounds per square inch range.

The only binder required in the present composition to provide satisfactory fire stop/fire break performances as well as easy removability in a non-fire situation is gypsum plaster, or calcium sulfate hemihydrate. Thus the compositions of the present invention do not require the inclusion of other inorganic cementitious binders such as Portland cement or high aluminous cements nor the inclusion of organic binders such as urea formaldehyde polymers, adhesive silicone copolymers and the like. The plaster for use in the formation of the compositions will generally be present in its beta form, commonly called plaster of Paris and will ordinarily have a normal consistency of above about 80 cc. (preferably about 85–100 cc.) in order to assist in imparting high water demand and proper flow and slump to the overall formulation. There does not appear to be an upper limit to the normal consistency of the plaster ingredient, other than commercial availability. The total composition of binder, aggregates and optional materials will have a formulated normal consistency of about preferably 120–170 cc. For purposes of the present invention "normal consistency", referring to either the formulated composition or a particular ingredient therein, may be defined as the minimum amount of water in cubic centimeters which is just sufficient to form a pourable slurry from 100 grams of the dry material. Such term is one generally accepted in the plaster industry with regard to describing the amount of water in cubic centimeters to be added per 100 grams of plaster in forming a pourable slurry. The procedure for establishing normal consistency measurements for any particular plaster are set forth in the article "U.S.G. Methods of Testing Gypsum Cement and Plasters" by Robert Hamilton, pages 68–71 and 93 of *Ceramic Industry*, Vol. 71, No. 1, July, 1958.

As the binder is the primary contributing factor to the compressive strength of the cast formulation, the amount of plaster binder is important to establish a cast compressive strength within the general range of about 50–300 p.s.i. and the more preferred range of 100–200 p.s.i. The plaster ingredient must be present in a minimum amount that will provide sufficient strength to hold the dry cast composition together and to resist ordinary wear and abrasion of the fire barrier, i.e., preferably about 150 p.s.i. If substantially lower amounts of plaster than the range set forth herein are used, compressive strengths will be below 50 p.s.i. and generally insufficient to resist damage from normal in-place handling and be subject to crumbling. Further, the use of substantially larger proportions of plaster at the lower end of the consistency ranges in the composition will result in dry compressive strengths well above 200 p.s.i. resulting in fire barriers that will be difficult to remove without causing destruction or damage to cables within the tray portion covered by the fire barrier. As a general criterion it is especially preferred that the set formulated composition have a dry compressive strength of about 140–160 pounds per square inch, and this is generally satisfied by using the preferred amounts of a plaster ingredient in the composition having a normal consistency of about between 85–100 cc.; and of course, slight modifications may be made in the general amounts of the plaster binder ingredient or by the use of plasters having a slightly higher or lower normal consistency provided that adjustments are made in the amount of the gauging water and the type and proportion of blended lightweight aggregates so as to maintain the necessary criterion of wet flowability and pseudo-plasticity plus dry cast density and compressive strength.

The lightweight inert aggregate ingredients of the formulated composition comprise a combination of diatomaceous earth and any one of those lightweight aggregates which are inert in plaster cements, are either exfoliated or do not further expand upon being subjected to the heat of a fire in any substantial measure (greater than about 1% volume) have a dry bulk density in the range of about 5–20 pounds per cubic foot, and have a water carrying capacity of between about 0.7 and 4 times their weight of water.

The diatomaceous earth ingredient, also referred to in the trade as diatomite or kieselguhr, for use in the present formulation is the uncalcined siliceous rock aggregate of sedimentary rock origin having a water carrying capacity of between about 1.5 and 4 times its weight of water. Such materials are further characterized in mainly comprising the fossilized remains of diatoms and having an apparent bulk density of about 5–16 pounds per cubic foot, wet densities of about 10–30 pounds per cubic foot, and specific gravities of 1.9 to 2.35. Preferably the finer grades of diatomaceous earth will be used in the present invention such that it will have a particle size of about 95% passing 325 mesh (U.S. Standard Seive).

The diatomaceous earth appears to be an essential ingredient in the present formulation in the amounts set forth hereinabove in order to provide sufficient wet "handleability" or "fattiness" and, in conjunction with the plaster and water in proper amounts, to provide satisfactory pseudo-plastic flow properties to the formulation. For the proportions of plaster and water set forth hereinabove, if substantially less than 10% of diatomaceous earth is present in the formulation, there generally will be insufficient pseudo-plastic characteristics to the formulation for pumping placement and for "fattiness" as to cause complete penetration of the formulation during placement. Amounts of diatomaceous earth substantially greater than 40% by weight of the formulation will have severe adverse impacts on dry density and compressive strength of the cast formulation. It should also be noted that while the diatomaceous earth ingredient is essential to provide body to the wet formulation, it also functions as contributing to the refractorinous and compressive strength of the cast formulation. The diatomaceous earth ingredient is a standard article of commerce available under a variety of brand names and grade designations such as DICALITE diatomite and CELATOM diatomite. A preferred material is DICALITE SA-3 available from Grefco Inc. or CELATOM CS-2531 available from Eagle-Picher Industries, Inc.

The second lightweight inert aggregate ingredient is essential to balance out the formulation for primarily dry cast density and, secondarily, wet consistency and water balance of the aqueous slurry. Such materials must have a capacity to absorb and carry large amounts of liquids in aqueous slurry. Generally expanded vermiculite, expanded perlite, glass microspheres, wollastonite and the like preferred, particularly in the finer particle size ranges, i.e., 30% passing 50 mesh (U.S. Standard). Vermiculite and perlite are particularly preferred for use in the present invention, and such should be utilized in expanded form as otherwise the set composition will self-expand during exposure to the flames of a fire causing cracking and disruption of the set formulation While expanded vermiculite or perlite will absorb large amounts of liquids and still remain free flowing, they affect the consistency of the overall composition more than the diatomaceous earth above, but provide less impact on body, fattiness, and slump of the wet formulation. Thus, usage of substantially more than the about 10-3 weight percent in the compounded formula, or lesser amounts will have very adverse effects of the compounded formulation both in the wet slurry state and in dry cast state. It appears also that particle size distribution of the very fine plaster and relatively larger second aggregate and much larger diatomaceous earth affects the body, fattiness, slump and slip characteristics of the wet formulation. As stated above, the finer particle ranges available for the second aggregate are preferred, although coarser grades, such as about 60% retained by 30 mesh (U.S. Standard) will be satisfactory for the second aggregate in the blends of this invention. Substantially coarser amounts of grades of lightweight aggregate with substantially higher percentages of coarser particles than set forth above are generally not prefered as not allowing the aqueous slurry to penetrate and completely fill narrow interstices and openings between cables, cable bundles and cable trays or raceways. Other inert fillers that do not have low bulk densities or high water carrying capacities cannot be present in any substantial amounts, and thus the presence of applicable amounts of sands, fly ash or the like would have severe deleterious affects on both the wet slurry or the dry cast compounded formulation. Of course, the particular amounts of the other inert lightweight aggregetes besides the preferred vermiculite or preferred perlite which may be used in the present invention will vary with their different water carrying capacities and loose bulk densities. However suitable amounts of a particular aggregate may readily be determined by adding a particular amount and then adjusting various amounts until the formulation has a normal consistency in the proper range, and the cast material has a preferred cast density of 25-35 pounds per cubic foot and preferred dry compressive strength of 100-200 p.s.i.

Since power transmission cables, particularly of large capacity, ordinarily generate some heat, glycerine and boric acid are included in the formulation to assist in providing some calcination inhibition. These materials are taught in U.S. Pat. No. 3,393,116 as providing calcination inhibition in this plaster coatings for use at lower temperatures. However the criterion for the compositions of the present invention are considerably different. Firstly thick cast blocks are involved. Secondly, and of more importance, studies have shown that cable core temperatures of 70° C. (158° F.) are common for a normal continuous operations and that cable core temperatures may reach 90° C. (194° F.) during a surge of power. For this reason, the compounded formulation when cast in place as a fire barrier must provide much greater protection than suggested in the hereinabove referred to patent. Testing of various formulations of the present invention at expected possible use temperatures of 93.3° C. (200° F.) and also at 115.6° C. (240° F.) established no correlation between the amount of glycerine/boric acid combination at the different temperatures and some testing indicated that there was greater calcination with the glycerine/boric acid alone which suggests that other ingredients in the formulations are providing a contributing effect in conjunction with the glycerine and boric acid to protect the formulation at these temperatures.

Optionally a set control agent, generally a retarder, but sometimes an accelerator or mixtures of set control agents may be included in the compositions of the present invention. The set controlling additives which may be employed in the gypsum cement compositions of this invention can be any of those commonly employed in the art for controlling the setting time of plaster compositions. These include set retarders such as the commercial keratinacous retarders, sodium citrate, citric acid, tartaric acid, Rochelle salts and the like. The amount of any particular retarder will depend upon its particular efficacy as a retarder, but will generally vary over the range of about 0° to 0.5% by weight based on the weight of plaster. Thus in one highly preferred formulation employing about 60% plaster by weight in the composition no retarder was present in a formulation for troweling application and from 0.75% to 0.125% based on the weight of the total composition (0.045-0.075% based on weight of plaster ingredient) for machine application was present; and in another highly preferred formulation containing 35% by weight of plaster in the composition, no retarders were present for troweling application usage while 0.05% by weight of the total composition (and 0.14% based on the weight of the plaster ingredient) of retarder was present for machine application for a set time of 70 minutes.

Optionally a corrosion inhibitor may be included in the compositions of the present invention as an adjuvant to lessen possible corrosive effects of the composition on aluminum or galvanized steel cable trays. Any of the various commercially available materials for such usage that are compatible with aqueous systems may be used in the customary amounts. For example, sodium metaborate octahydrate or sodium tetraborate containing preparations, or sodium nitrite containing preparations, commercially compounded mixtures of boron nitriles such as that available under the trademark FERNOX from Newage Industries, the various glycol ethers, and mixtures thereof may be utilized.

The dry plaster compositions of the invention are prepared by blending the various components in a dry state in the proportions indicated. As glycerine is generally available in a liquid state and the amounts of glycerine and boric acid are quite small, they are preferably incorporated by premixing them with one of the lightweight aggregates before mixing the lightweight aggregate into the rest of the blended ingredients. After mixing, the dry plaster composition can be stored for long periods until such times as it is desired for use as a fire barrier by mixing water therewith. The dry plaster compositions have good shelf life, and mixed with water provide good fire barrier compositions which are particularly adapted either for hand or machine application. As is known in the art, a plaster which is applied by hand, in order to have proper spreading must have a thicker consistency than plasters utilized in machine application. Accordingly, the hand applied plasters must have plasticity and fattiness characteristics for satisfactory working and troweling and the machine applied plasters must have better flow characteristics when energy is applied to them. The gypsum cement compositions of this invention have been found to possess excellent working characteristics, particularly with respect to pseudo-plasticity, fattiness and plasticity qualities. The variation of the amounts of water within the ranges indicated affords the control of the degree of ordinary plasticity and fattiness which gives extra body during hand application.

The amount of water to be mixed with the dry formulated composition for forming the fire barrier will vary depending upon, primarily, whether machine application or hand application is contemplated. The means of application also largely determines the necessary set time for the formulation and the amounts or types of optional retarder ingredient.

The setting time of the aqueous slurry, as determined by standard Vicat set well known in the plaster industry, will generally vary from about 10 minutes to about 3 hours or slightly more depending upon intended application means. For hand placement or troweling applications a lower consistency and shorter set time is desired to allow for building up successive layers of applied slurry to obtain the desired thickness of the fire barrier. This is particularly appropriate in fire stop applications where small batches of slurry will be mixed and hand placed to begin filling a wall or ceiling penetration. In forming a fire break generally higher consistencies and longer setting times will be desired in order to insure capability of pumping the formulations through long hoses and placement without premature set.

The mechanical energy for the system to show pseudoplasticity properties during hand application is found in the mixing with water, pouring, working and troweling during the application; and during machine application is found in mixing, pumping and spraying. Further mechanical energy imparted after initial application of the plaster composition is readily accomplished by vibrating the formulation as by mechanically impacting or rubber mallet pounding upon the cable tray or adjacent wall segment. Such action is maintained while the material is flowing and is continued during visible settling of the formulation into place until the area is filled to overflow.

It has been determined that for poke-through penetrations, satisfactory fire stops are obtained from the formulations by building up a thickness of about 2 inches depth from the surface of the wall etc. For fire break applications a block of about two inches thickness over the cables is generally desirable and at least $\frac{1}{4}$th to $\frac{1}{2}$ inch on the bottom of solid bottom trays, more preferably upwards toward an inch is desirable. The most difficult situation of slurry penetration, it has been found, is where the cables are laying in the tray perfectly in line with each other and touching. In this situation wedging the cables apart by as little as $\frac{1}{4}$th of an inch readily permits penetration and insures a bottom seal with the plaster composition. Further, in situations where "ladder or rung" cable trays that have slitted openings in the bottom are used instead of a solid bottomed cable tray, it is desirable to temporarily seal the bottom openings as by placing any rigid sheeting material across the bottom of the tray. It is preferred that the sheet have formed up edges of about $\frac{1}{4}$th-1 inch to provide some spacing away from the bottom of the tray that can be filled with the slurry. For this usage a piece of sheet metal, sheet plastic, hardboard, gypsum board or fiber glass sheets and the like may be utilized. Glass fiber scrimmed mat and even narrow mesh metal lath may be used to cover the openings in the bottom of ladder type trays. The most desirable way to form sufficient slurry against the slotted cable tray bottom is by troweling a quantity of slurry onto a sheet having upturning edges and then adhesively taping or clamping the sheet to the tray. Alternatively a sheet may be taped without spacing directly to the bottom of the tray to prevent leaking of the slurry out of the tray during machine application, or spaced about $\frac{1}{2}$ of an inch or 1 inch below the tray and slurry sprayed or pumped into the cable tray and optionally into the bottom plate before fastening it to the tray. For this usage it has been found particularly desirable to increase the amount of water about 10 cc. above normal consistency for the machine application slurry, at which point the slurry readily and completely flows through openings as small as $\frac{1}{8}$ of an inch with very light vibration. At troweling consistencies or the lower end of the pumping consistency normal consistency range considerable vibrating or pounding is required to induce flow especially when a temporary bottom plate is used without edges to provide a spacing away from the bottom of the cable tray. Plastic sheeting, particularly clear PLEXIGLAS acrylic is preferred as providing a visual indication of filling the bottom area and ease of removing the temporary sheets from the partially dried gypsum composition as compared to other materials which may have a tendency to stick and damage the weak freshly set gypsum surface on removal.

For troweling, with the proper amount of water mixed with the plaster composition, application in poke-through areas of cable penetration in walls, floors and ceilings it is preferred to place a base in the wall opening against which the slurry will be trowelled. Such base may be formed by cutting a piece of resilient or compressible insulation material such as mineral wool mat slightly oversized to the opening and pushing it about 2 inches into the opening from the front face of the wall etc. Other materials forming suitable bases include gypsum board, hardboard, metal lath, plastic sheets and the like. When using a mineral wool insulation felt as the base, it is particularly desired to place a facing against the felt, particularly where large openings are involved, to reduce the force on the trowel required to wet the felt with the aqueous slurry. Such a facing may be as simple as prewetting the face of the felt with water or including a small amount of customary wetting agents as well known in the plastering trade. Another method is to place a metal plastering lath in front of such insulation felt to provide a structurally stronger base for receiving the aqueous plaster composition or to provide a polymeric latex coating such as PLASTERWELD latex, applied to the insulation felt to seal and strengthen trowelling as well known in the plastering trade. Finally as a further trowelling application, the plaster composition can be trowelled onto the bottom of open bottom cable trays to seal and completely cover the cables. Trowellability was found to be dependent upon consistency; and about the middle area of the recommended consistency range for trowelling application is most preferred, as at the low end a tearing and rolling of the thick slurry may result and at the high end there is a loss of fattiness with the increasing fluidity and more tendency for overflow and spillage. The most desirable consistency range for trowelling application using a composition of the invention having a 140 cc. normal consistency appears to be from about 25 to 35 cc. below that consistency. At this level the aqueous slurry can readily be trowelled to a thickness of about 1 to $1\frac{1}{2}$ inches on a vertical surface without layering. At other consistencies successive layers of less thickness should be applied to avoid having the slurry slide down vertical surfaces and to completely fill between the wall substrate and the backing substrate.

The following examples will illustrate various specific embodiments of the compositions and the process of the present invention. It is to be understood that the examples are by way of illustration only and are in no way to be construed as limitations on the present invention. For example, specific lightweight aggregates, and accelerators or retarders and rust inhibitors for the plaster are exemplified in the preferred formulations. These are by way of illustration, and it is well understood to those skilled in the art that other materials well known for these purposes may be used instead. In the first series of evaluations, Example 1, two different preferred formulations were subjected to full scale laboratory fire test evaluations in various electrical cable systems. In the second series of evaluations various ingredients and proportioning of ingredients were evaluated for efficacy in compositions of the invention.

EXAMPLE 1

Preferred formulations were evaluated in various fire tests of different cable assemblies for effectiveness as fire barriers under simulated fire conditions. In this series of evaluations, the preferred formulations set forth hereinabove were utilized.

Evaluation 1—Horizontal Cable Tray Fire Break

For a fire test of a horizontal cable run, a section of cable tray was supported on four steel legs two feet above the floor of a fire test furnace. The fire chamber was 7 feet wide by 8 feet long by 6 feet high equipped with two forced air exhaust vents, and having one viewing side wall where the fire and smoke could be observed. A ladder-type cable tray of 16 gauge galvanized steel, 18 inches wide and 4 inches deep with 1 inch rung spacing was selected for this test because the bottom openings provide a constant source of air for burning cable and because this type of tray is representative of a realistic condition in many older power plants. A five foot long section of the cable tray was attached to the legs and 40 pieces, each seven feet long, of 600 volt control cable, $\frac{3}{4}$ of an inch in diameter and having four conductors of 7-strand copper wire (10 AWG) with butyl rubber insulation and polyvinyl chloride jacketing were placed in the tray so that each piece extended from and draped downward one foot past the end of the cable tray while providing space between the cables in the tray for air circulation. The draped ends of the cables were positioned over three natural gas burners in the floor of the fire chamber.

(A) Preferred Perlite Formulation

An 18 inch piece of solid bottom cable tray section was clamped to the trough-type cable tray two feet from the end to be exposed to fire so as to temporarily cover the rung openings where the fire barrier composition would be poured. For this evaluation, 15 pounds of the preferred perlite formulated plaster composition were mixed with 21 pounds of water and poured over the cables to form the fire break. Tapping the tray with a rubber mallet during placement allowed the plaster composition to flow completely around the cables in the tray. The poured gypsum composition extended the full 18 inch width of the cable tray and length-wise 16 inches along the bottom of the tray sloping to 12 inches across the top of the tray. Thus the fire break averaged 14 inches in length, 4 inches in depth and 18 inches in width. The poured gypsum composition was allowed to dry with forced air circulation at room temperature for five days before the fire test.

During the fire test all three gas burners directly below the ends of the cables were ignited, and the cable insulation was observed to begin to burn slowly. Five minutes into the test, the fire was burning vigorously enough that the natural gas burners could be turned off. The cable insulation continued to burn freely, developing large amounts of black smoke. The fire continued to burn for a one hour and ten minute duration, when all of the combustible materials in the cable coverings up to the fire break had been consumed and the fire self-extinguished. The cable tray was removed from the furnace and allowed to cool. The cables were easily removed from the tray by hand. Removal of the cables showed that the gypsum composition had filled all of the voids between the cables to the bottom of the tray for a length of approximately 14 inches. Observation after the test showed the cable coverings to be completely destroyed up to the fire break, but unaffected after about one inch into the gypsum composition, and the cables on the "cold" end of the tray section appeared unaffected.

(B) Preferred Vermiculite Formulation

The horizontal cable tray fire test was repeated using the preferred vermiculite formulation as the gypsum fire break material. For the fire test the equipment and procedures set forth for Evaluation #1A were repeated except that the pieces of control cable were each one inch diameter, 9 conductor, 7 strand copper wire with butyl rubber insulation and polyvinyl chloride jacket. It is believed that fire retardant chemicals had been incorporated by the cable manufacturer in this cable.

For the evaluation 15 pound batches of the formulated plaster composition were mixed with 21 pounds of water to result in a working use normal consistency of 140 cc. The poured gypsum formed a gypsum fire break 18 inches wide by 16 inches long by 4 inches deep in the tray, beginning 30 inches from the end of the ladder-type cable tray. The fire break was allowed to dry and maintained under forced heated air (about 200° F.) temperature for 27 days before the fire test to simulate the generated heat and heat surges in power control cable with current flowing through them over time. X-ray diffraction analysis of the fire barrier composition at the time of the fire test showed the gypsum had been converted back to hemihydrate.

For this fire test two additional gas burners were added because evaluations of the cable used in this test showed that fire would not spread easily or rapidly along it. The additional burners were located in the furnace floor/one foot closer to the fire stop along each side of the tray. The three burners located at the draped ends of the cable as set forth in Evaluation #1 were initially ignited and the cable insulation was observed to begin to smoke and then burn slowly and spread slowly towards the fire stop. At one hour and 50 minutes into the test one of the additional burners was ignited so that 4 burners were going. At 2 hours and 15 minutes into the test one of the burners under the ends of cables was shut off; and at 3 hours and 20 minutes all of the burners were turned off. The fire continued to burn until 5 hours and 54 minutes into the test, and then extinguished itself. The insulation up to the fire break had been consumed but the fire had not spread beyond the fire break and the cables on the other side had no visible exterior blistering or melting of their sheathing or insulation. After cooling, the cables were easily removed from the fire break by hand. Examination of the gypsum fire break showed several small cracks running the length of the block and penetrating into the gypsum block to the top cables. During the heat of a fire the metal cables expand and distort and it is believed that the force of thermal expansion of the conductors caused these cracks.

Evaluation 2-Vertical Raceway Fire Stop

For an evaluation of a fire stop for vertical cables not contained within a cable tray, 18 pieces of nine conductor cable having a one inch diameter with 7-strand copper wire, butyl rubber insulation and polyvinyl chloride jacketing, were hung vertically from a support angle within a fire test furnace chamber as described in Evaluation #1. The cables occupied a rectangular vertical space about six inches wide and 3 inches deep.

To form a fire barrier for this evaluation, a piece of sheet metal was wrapped around the cables to form a rectangular block 15½ inches wide and 9 inches deep around the cables. The sheet metal was held in place by filling the bottom three inches of the rectangular air space where the cables exited with a piece of 4 pounds per cubic foot density mineral wool insulation mat 4 inches thick.

Twenty-three pounds of the preferred perlite gypsum cement formulation were mixed with 32 pounds of water and placed into the form around the cables. The form was tapped with a rubber mallet during placement to be sure that the plaster composition flowed around the cables and formed a block within the sheet metal form. Two days after placing the plaster the sheet metal form and the mineral wool mat were removed, leaving a 12 inch by about 9 inch gypsum block 15½ inches high molded around the cables. The block was dried at room temperature conditions with forced air circulation for five days before the fire test.

For the first test, two gas burners were located directly below the vertically suspended cables, and ignited. Within two minutes, the cables were burning vigorously and the smoke from the burning butyl rubber insulation and polyvinyl chloride jacket had coated the block with black soot. After 20 minutes into the test, the burners below the cables were turned off; and the cables continued to burn vigorously over their entire length below the block. After 25 minutes from the start of the test, the leading edge of flame had reached the gypsum block, and the combustibles at the bottom of the sample had been consumed with the trailing edge of flame getting progressively closer to the block. At one hour and 24 minutes into the test, the flames were subsiding and the fire was characterized as "low intensity". Even though at one point in time during the test the flames appeared to encircle the gypsum block, the fire did not spread above the gypsum block. As the flames were subsiding after the fire had been characterized as "low intensity" a crack appeared in the gypsum block, and about a third of the block fell off the cables. Two minutes later the cable stopped flaming and the fire was characterized as being out. After cooling, the remainder of the gypsum block was removed from the cables. Examination of the block and the cables gave the appearance that the cable insulatin had melted or seriously deteriorated for about 5½ inches up into the block, and the next few inches showed blistering on the cable while the insulation in the top half of the gypsum block appeared to be undamaged.

Evaluation 3-Vertical Cable Tray Fire Break

A fire test was conducted on cable samples that were hung vertically from a structural steel angle that rested in the exhaust ports of the furnace described in Evaluation #1 and were supported in a vertical solid bottom cable tray, with the bottom ends of the cable positioned over two natural gas burners.

For this evaluation, 44 pieces each nine feet long, of cable having a one inch diameter, nine conductor and seven-strand copper wire, with butyl rubber insulation and polyvinyl chloride jacket, were placed in a 16 gauge galvanized steel solid bottom cable tray (18 inches wide by 4 inches deep by 5 feet long); and the cables were fastened to a support angle in the exhaust port of the furnace. To hold the gypsum slurry, a 16 gauge galvanized steel cover for the cable tray, 23 inches long by 18 inches wide by 4 inches deep, was bolted to the tray flanges; and a 4 inch thick by 5 inch wide by 18 inch long piece of 4 pounds per cubic foot density mineral wool mat was lightly compressed and fitted into the bottom of the covered tray, and held in place by bent wire clips.

(A) Preferred Perlite Formulation

For this evaluation, 26 pounds of the preferred perlite formulation were mixed with 36 pounds of water and placed in the area between the cable tray and the sheet metal cover. The cover and tray were tapped with a rubber mallet during placement to insure that the gypsum cement slurry would flow around the cables in the tray and fill all the interstices. Two days after the pour, the metal cover and mineral wool mat were removed and the gypsum cement block, approximately 20 inches by 18 inches by 4 inches, was allowed to dry at room temperature conditions with forced air circulation for 15 days before the fire test.

For the fire test, the two burners located directly below the cables were ignited. The cables immediately began to burn vigorously, giving off large quantities of smoke (the volume of smoke was so great that it could not be handled by the furnace exhaust system and building roof ventilators, causing the room containing the test furnace to become filled with acrid smoke). Fifteen minutes after igniting the burners, the burners were turned off and the fire continued to burn vigorously. At 25 minutes after ignition, the insulation and sheathing on the cables below the fire break had been consumed. As the trailing edge of the flame approached the fire break, the smoke in the room began to thin out. The cables continued to burn until one hour and 14 minutes after ignition, when the flames extinguished spontaneously.

Although flames had enveloped the gypsum block during the fire, the fire had not spread to cables above the fire break. Examination of the gypsum block after the test showed that the cable insulation had deteriorated approximately three inches through the mineral wool at the bottom of the fire break, but above that point (which was surrounded by the gypsum block) the cables appeared unaffected.

(B) Preferred Vermiculite Formulation

The vertical cable tray fire test was repeated using the preferred vermiculite formulation as the fire break material. The equipment, cable and set up were identical to those set forth hereinbefore for Evaluation #3 except that the cover for the tray had a one inch depth instead of a 4 inch depth.

Again, a piece of 4 pounds per cubic foot density mineral wool mat, 18 inches long by 2 inches wide, was stuffed into the bottom opening of the cable tray and cover to form a seal to hold the plaster slurry because of the basically vertical pour of the slurry. Initially a 10 pound batch of the plaster formulation was mixed with 13 pounds of water to give a 130 cc. consistency slurry.

After placement a second 10 pound batch of the formulated plaster was mixed with 14 pounds of water to give a thinner 140 cc. slurry to finish filling the spaces above the mineral wool and between the cover and cable tray. Filling was continued, with rubber mallet pounding, until a small amount of slurry was forced around the mineral wool at the bottom. The assembly was then air dried at room temperature for 14 days before the fire test.

The fire test was conducted as set forth herein for Evaluation #3A; with the lower end of the cables commencing to burn two minutes into the test. The cable fire went out shortly before two hours from starting the test. The fire had stopped at the cable cover and had not spread around the gypsum cement fire barrier. Examination of the fire break after the test showed that the space around the cables had been well filled with the gypsum formulation without any voids between the cables. There was deterioration of the cable insulation for about 2 inches into the gypsum block and no apparent effect on the cable insulation through the rest of the fire break or above the fire break.

In addition, before this test, thermocouples had been attached to one of the cables in the top layer of cables in the tray, at the following locations:

1. About ½ inch away from the fire break on the side toward the gas burners, with the thermocouple attached to the outer surface of the cable insulation.
2. Mid-way along the fire break, with the thermocouple attached to the outer surface of the cable insulation.
3. About ½ inch away from the fire break on the side opposite the gas burners, attached to the insulation surface with the measuring point of the thermocouple one inch way from the cable.

The temperatures (in degrees Fahrenheit) at various times during the fire test at these thermocouples are set forth in Table 1.

TABLE 1

| Thermo- | Time (Min.) | | | | | | | |
|---|---|---|---|---|---|---|---|---|
| couple | 15 | 30 | 45 | 60 | 75 | 90 | 105 | 120 |
| #1 | 860° F. | 940° | 880° | 840° | 740° | 750° | 780° | 680° |
| #2 | 80 | 95 | 135 | 180 | 215 | 220 | 220 | 215 |
| #3 | 350 | 290 | 190 | 180 | 140 | 140 | 190 | 170 |

Evaluation 4—Fire Stop in Three Hour Rated Wall

For this evaluation a segment of fire rated wall of 8 inch thick solid concrete blocks was constructed in the fire test furnace of Evaluation #1. The wall segment was constructed with a large rectangular opening to be penetrated by two cable trays containing power and control cables, and three smaller circular openings to be penetrated by power and control cables. The openings were then fire stopped in accordance with the present invention and the assembly tested under IEEE (the Institute of Electrical and Electronics Engineers, Inc.) Standard Cable Penetration Fire Stop Qualification Test Procedure 634-1978 and ASTM E119 fire exposure for three hours.

For the rectangular opening two 16 gauge 15 foot long cable trays as described in prior Evaluations (one ladder type and one solid bottom) were filled with 36 pieces of Anaconda power cable, 100 pieces of REX brand control cable, and 36 pieces of Collyer control cable. The trays, placed one above the other with the ladder type on top, were spaced apart by channel framing and secured to a trapeze suspended from the top of the wall segment. The trays extended one foot beyond the exposed face of the wall, leaving 3 feet 4 inches of tray projection beyond the wall face on the unexposed side.

One of the two 6 inch diameter circular openings in the wall segment was fitted with 5 Okonite control cables and 5 Okonite power cables. The other 6 inch circular opening was fitted with 4 Anaconda power cables, 12 REX brand control cables and 3 Okonite control cables. The third circular opening, 10 inches in diameter, was fitted with a 6 inch diameter pipe sleeve containing 5 Anaconda power cables, 15 REX brand control cables and 4 Collyer control cables.

For the fire stop in the rectangular opening 26 pounds of the preferred vermiculite formulation were mixed with 36.1 pounds of water and placed in each of the cable trays over the cables in the area where the tray passed through the wall. A 16 inches long temporary form had been fitted to the bottom of the ladder tray where it passed through the wall to contain the fire stop formulation. The fire barriers were full width of the cable trays, at a height equal to the tray rail height, approximately 16 inches long at the bottom of the tray and 12 inches long at the top of the tray. The rectangular opening was then closed using 4 inch thick pieces of mineral wool mat 4 pounds per cubic foot density compressed slightly in the wall opening and fitted in the openings around the trays. Then the rectangular opening was sealed by machine applying two inches of the preferred vermiculite formulation on each face with mix proportions for pumping of 56 pounds of water per 50 pounds of dry composition.

The circular openings were fire stopped by pouring a mixture of 50 pounds of preferred vermiculite gypsum cement formulation and 69.4 pounds of water into temporary forms fitted around the cables. The forms were removed when the formulation had hardened.

The wall assembly was forced air dried for 13 days, assuring dry fire stops, prior to testing. Thermocouples were attached to record temperatures on the unexposed surface of the concrete block wall and fire stop formulation, and on the jacket of the cable and cable tray at the interface of the unexposed face of the wall as outlined in IEEE standard 634-1978.

One side of the wall was subjected to a fire programmed in accordance with ASTM E119 time—temperature curve, as required by IEEE 634-1978. None of the cables ignited beyond the unexposed surface and no passage of hot gasses or flames occurred through the fire stops during the three hours of fire exposure. The unexposed surface temperatures on the wall and fire stops were well below the 250° F. temperature rise limit specified by ASTM E119 for a three hour rating—the wall developed a 174° F. rise and the rectangular fire stop developed a 104° F. rise at three hours, as measured under asbestos pads, and a maximum rise of only 69° F. for the thermocouples on the rectangular fire stop not covered by asbestos pads. None of the recorded temperatures for the exterior of cable jackets at their interface with the unexposed face of the fire stops reached 700° F. during the three hours—the larger conductor power cables reached a maximum recorded temperature of 522° F. and the control cables reached 350° F.

Immediately after the fire endurance test the fire-exposed surface was subjected to a 30 p.s.i. hose stream test for 71 seconds as prescribed by IEEE 634-1978 for industrial and commercial applications. The assembly withstood the force and erosion of the hose stream with no water passing to the unexposed surface as prescribed in ASTM E119 and IEEE 634.

EXAMPLE 2

In a number of comparative evaluations, various different lightweight aggregates were incorporated into plaster binder compositions, and the formulations evaluated for normal consistency of the formulation, dry cast density of the formulation in pounds per cubic foot (by ASTM Method C26-56), and compressive strength of the dry cast formulation in pounds per square inch (ASTM Method C472-73) for properties in formulating fire barriers of the present invention. Evaluations were performed on three samples and the samples averaged for the characteristics being evaluated. Typical representative results are set forth in the ensuing tables.

It may be noted that the sieve analysis of the plaster ingredient used was a minimum of 93% passing through No. 100 U.S. Standard sieve; that of the diatomaceous earth used was a maximum of 5% retained on No. 325 U.S. Standard sieve; and the silicone coated perlite; vermiculite #4; glass microballons and preferred vermiculite and perlite formulations were as follows:

| % Retained on U.S. Standard | Coated Perlite | Vermiculite #4 | Glass Micro Balloons | Over-all Comp. Perlite | Vermiculite |
|---|---|---|---|---|---|
| 20 mesh | 29.64 | 13.99 | 0 | 8.8 | 9 |
| 30 | 15.53 | 17.85 | 0 | 24.2 | 20.85 |
| 50 | 21.32 | 38.14 | .1 | 30 | 33.35 |
| 70 | 8.33 | 12.78 | 1.42 | 12.6 | 11.1 |
| 100 | 6.40 | 9.94 | 21.61 | 9.4 | 9.1 |
| 120 | 2.94 | 2.84 | 11.42 | 5 | 5.1 |
| Passing through 120 mesh | 15.84 | 4.46 | 65.45 | 10 | 11.5 |

In a first evaluation, as set forth in Table 2, various lightweight aggregates were blended with a plaster having a normal consistency of 85 cc. and mixed with water to determine normal consistency of the mixed formulation. As can be seen from an examination of the results set forth in Table 2, lightweight aggregates which were particularly chosen for evaluation to provide an approximately correct normal consistency in the formulation and dry cast density when evaluated alone were much too high for preferred compressive strengths and densities.

For a second evaluation, as set forth in Table 3 various proportions around that of Sample #5 of Table 2 were evaluated for physical properties. Basically, whether or not the particular blend gave satisfactory physical properties depended upon both the type and the amount of the second lightweight aggregate blended with the diatomaceous earth. However, Sample #5 and Sample #9 in Tables 2 and Table 3 respectively establish that, depending upon the particular physical characteristics of the second lightweight aggregate from about 10% to about over 30% by weight of the formulation may be a second lightweight aggregate in the presence of 35% of diatomaceous earth in the formulation.

In a third evaluation, set forth in Table 4, other amounts of diatomaceous earth ranging from about 15% to 30% of the formulation gave desirable physical properties with varying amounts of a second lightweight aggregate, depending upon the proportion and amount of the second aggregate. In the evaluations set forth in Tables 2 and 3, the plaster formulation did not contain any other ingredients other than plaster and aggregate, and those in Table 4 were complete formulations of the invention.

TABLE 2

| Sample - | 1 | 2 | 3 | 4 | 5 |
|---|---|---|---|---|---|
| Formulation | | | | | |
| Plaster, 85 cc. | 80% | 80% | 80% | 60% | 35% |
| Diatomaceous Earth | 20% | — | — | 20% | 35% |
| Vermiculite #4 | — | 20% | — | 20% | — |
| Perlite, coated | — | — | 20% | — | 30% |
| Properties | | | | | |
| Consistency cc. | 115 | 150 | 100 | 156 | 140 |
| Density lb/cu.ft | 45.6 | 32.1 | 39.2 | 28.7 | 26.6 |
| Compressive Strength psi | 518 | 233 | 540 | 148 | 123 |

TABLE 3

| Sample - | 6 | 7 | 8 | 9 | 10 |
|---|---|---|---|---|---|
| Formulation | | | | | |
| Plaster, 85 cc. | 35 | 35 | 45 | 55 | 65 |
| Diatom. Earth | 35 | 35 | 35 | 35 | 15 |
| Vermiculite #4 | 30 | — | — | — | 15 |
| Perlite, coated | — | — | — | — | — |
| Glass Microballoons | — | 30 | 20 | 10 | 5 |
| Properties | | | | | |
| Consistency cc. | 225 | 190 | 180 | 165 | 40 |
| Density lb/cu.ft | 20.3 | 18.7 | 22.1 | 27 | 30.4 |
| Compressive Strength psi | 53 | 38 | 60 | 116 | 245 |

TABLE 4

| Sample - | 11 | 12 | 13 | 14 | 15 | 16 | 17 |
|---|---|---|---|---|---|---|---|
| Formulation | | | | | | | |
| Plaster, 85 cc. | 57.5 | 50 | 65 | 55 | 55 | 57.5 | 65 |
| Diatom. Earth | 27.5 | 22.5 | 20 | 20 | 20 | 18.75 | 15 |
| Vermiculite #4 | 15 | 22.5 | — | — | 12.5 | 18.75 | 20 |
| Perlite, coated | — | — | — | — | — | — | — |
| Glass Microballoons | — | 5 | 15 | 25 | 12.5 | 5 | — |
| Properties | | | | | | | |
| Consistency cc. | 155 | 172 | 138 | 158 | 152 | 152 | 138 |
| Density lb/cu.ft | 29.5 | 24.5 | 26.3 | 23.8 | 26.5 | 25.5 | 31.8 |
| Compressive Strength psi | 134 | 122 | 172 | 120 | 180 | 127 | 169 |

Having completely described this invention, what is claimed is:

1. A gypsum cement composition adapted for use in electrical cable fire barrier operations having pseudoplastic flow in aqueous slurry, having a dry density of about 25 to 35 pounds per cubic foot and having a dry compressive strength when set below 300 pounds per square inch, which comprises by weight:

about 30 to approximately 80% calcium sulfate hemihydrate;

about 10 to approximately 40% diatomaceous earth aggregate having an apparent bulk density in the range from about 5 to approximately 16 pounds per cubic foot and a water carrying capacity in the range from about 1.5 to approximately 4 times its weight of water;

about 10 to approximately 30% of a second aggregate having a dry bulk density in the range from about 5 to approximately 20 pounds per cubic foot, and a water carrying capacity from about 0.7 to approximately 4 times its weight of water;

and by weight based on the weight of hemihydrate about 0.05–1.25% glycerine and about 0.05–0.7% boric acid.

2. A composition in accordance with claim 1 having a compressive strength when set in the range from about 100 to approximately 200 pounds per square inch.

3. A composition in accordance with claim 1 having a compressive strength when set of about 140–160 pounds per square inch.

4. A composition in accordance with claim 1 in which the diatomaceous earth has a particle size of about 95% passing 325 U.S. Standard mesh.

5. A composition in accordance with claim 1 in which the second aggregate has a particle size of about 30% passing 50 U.S. Standard mesh.

6. A composition in accordance with claim 1 in which the calcium sulfate hemihydrate has a normal consistency greater than about 80 cc.

7. A composition in accordance with claim 1 comprising about 60% calcium sulfate hemihydrate; about 20% diatomaceous earth; about 20% vermiculite; about 0.7% by weight of hemihydrate of glycerine; and about 0.07% by weight of hemihydrate of boric acid.

8. A composition in accordance with claim 1 comprising about 35% calcium sulfate hemihydrate; about 35% diatomaceous earth; about 28% perlite; about 0.7% by weight of hemihydrate of glycerine; and about 0.07% by weight of hemihydrate of boric acid.

9. A settable pseudo-plastic mass comprising an aqueous slurry of the composition of claim 1.

10. A settable mass in accordance with claim 9 for pumping application having in the range from about 120 to approximately 170 pounds of water per 100 pounds of dry gypsum cement composition.

11. A settable mass in accordance with claim 9 for trowelling application having in the range from about 100 to approximately 130 pounds of water per 100 pounds of dry gypsum cement composition.

* * * * *